United States Patent [19]
Kubo

[11] Patent Number: 5,986,837
[45] Date of Patent: Nov. 16, 1999

[54] IMAGE SIGNAL PROCESSING APPARATUS HAVING AN ERASING FUNCTION

[75] Inventor: Ryoji Kubo, Tokyo, Japan

[73] Assignee: Canon Kabushiki Kaisha, Tokyo, Japan

[21] Appl. No.: 08/402,989

[22] Filed: Mar. 13, 1995

Related U.S. Application Data

[63] Continuation of application No. 07/978,502, Nov. 18, 1992, abandoned.

[30] Foreign Application Priority Data

Nov. 21, 1991  [JP]  Japan .................................. 3-306238

[51] Int. Cl.$^6$ .................................................. G11B 19/04
[52] U.S. Cl. ............................... 360/60; 360/57; 360/66; 386/120; 386/121; 386/125
[58] Field of Search ............................. 360/33.1, 57, 66, 360/14.1, 35.1, 60, 47; 358/342, 909; 386/46, 96, 117, 120, 121, 125, 64

[56] References Cited

U.S. PATENT DOCUMENTS

| | | | |
|---|---|---|---|
| 4,849,832 | 7/1989 | Yamagata et al. | 360/57 |
| 5,062,009 | 10/1991 | Yamagata et al. | 360/66 X |
| 5,093,731 | 3/1992 | Watanabe et al. | 358/335 |
| 5,138,459 | 8/1992 | Roberts et al. | 358/209 |
| 5,153,730 | 10/1992 | Nagasaki et al. | 360/35.1 |

Primary Examiner—Alan Faber
Attorney, Agent, or Firm—Fitzpatrick, Cella, Harper & Scinto

[57] ABSTRACT

The invention provides an image signal processing apparatus for processing an image signal. When an image signal is supplied and the input image signal is stored onto a memory medium and the image signal stored on the memory medium is generated, only the image signal generated from the memory medium in the image signal stored on the memory medium can be erased, so that the image signal can be stored by a simple construction without erroneously erasing the image signal stored on the memory medium.

12 Claims, 5 Drawing Sheets

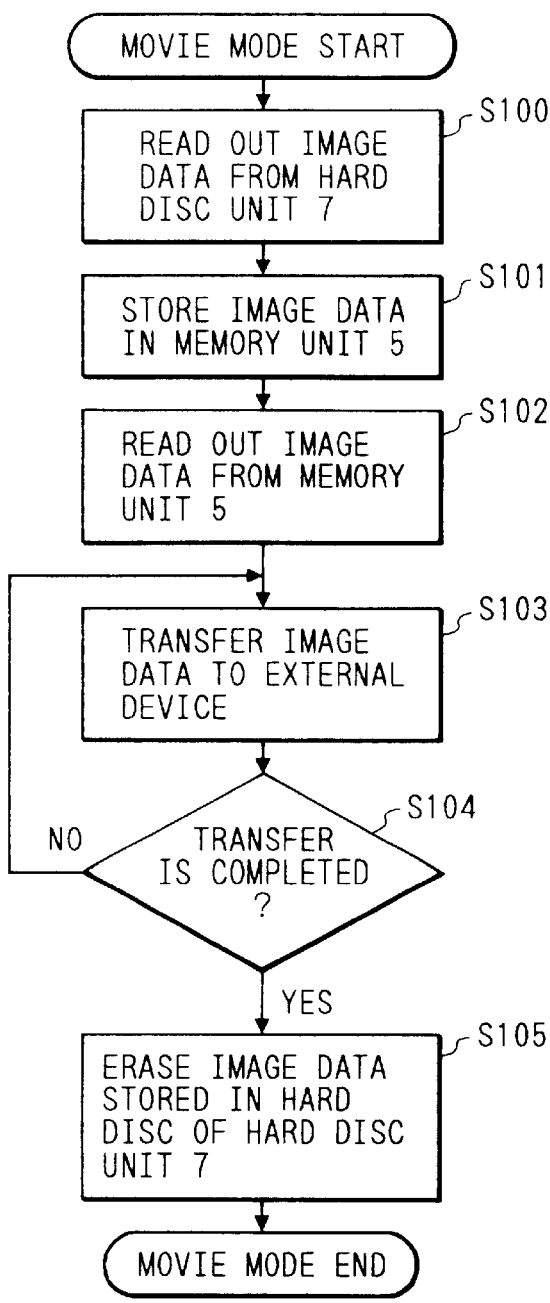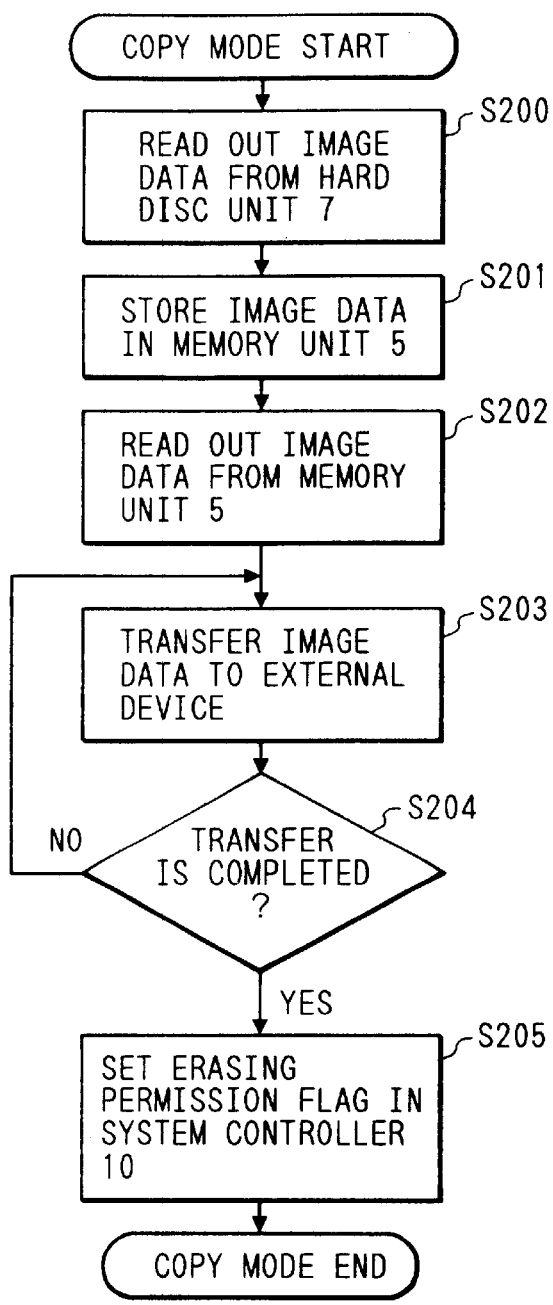

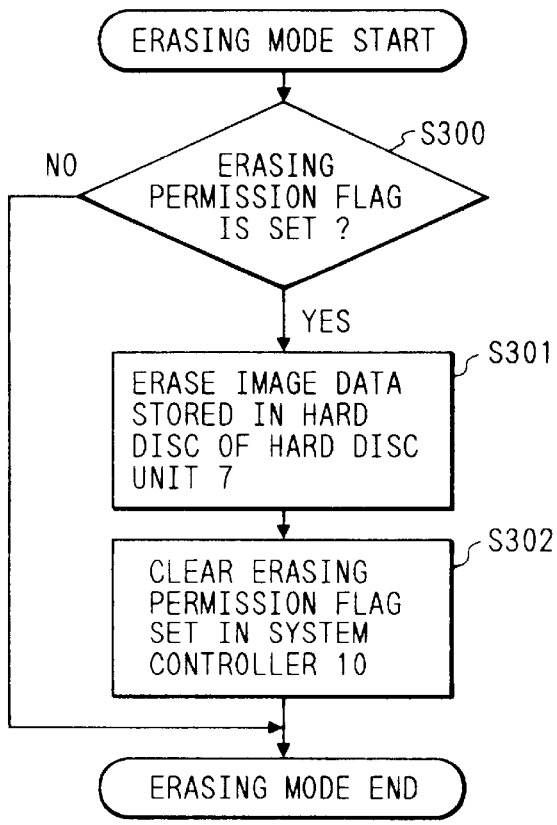
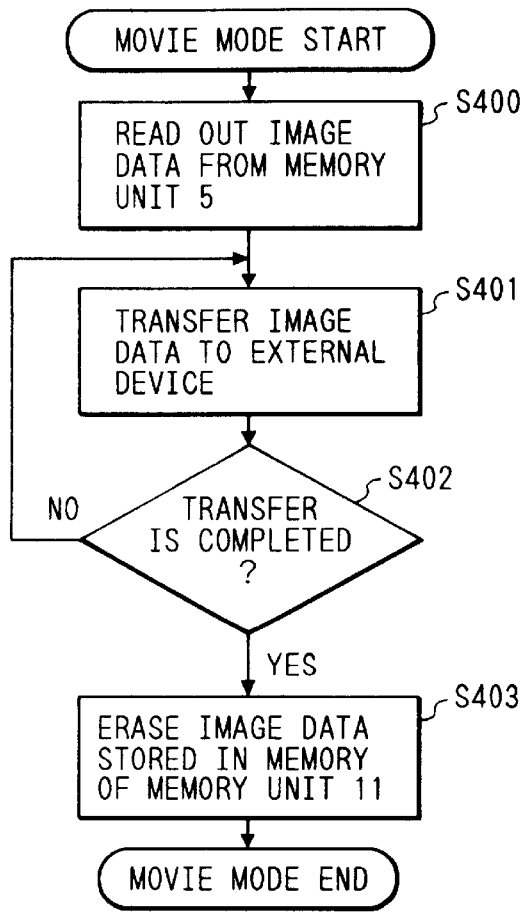

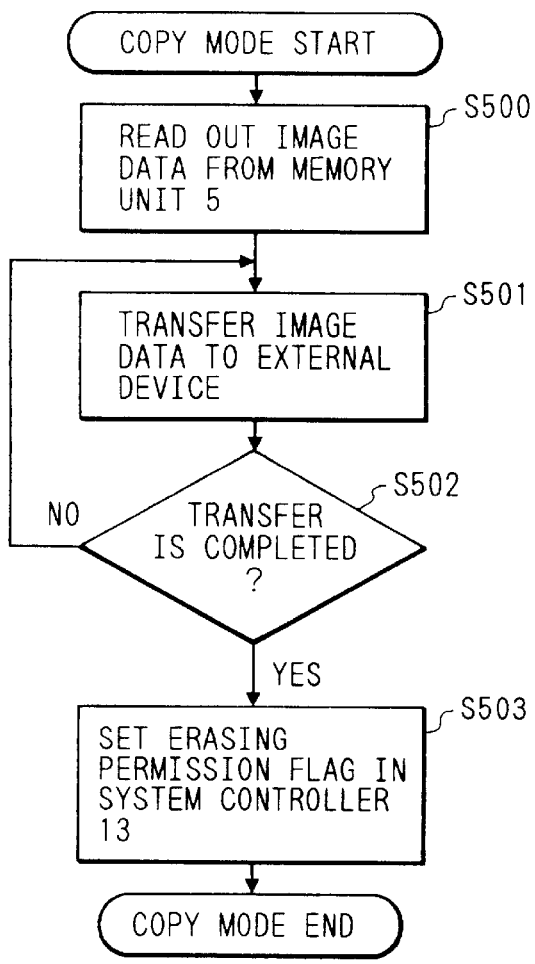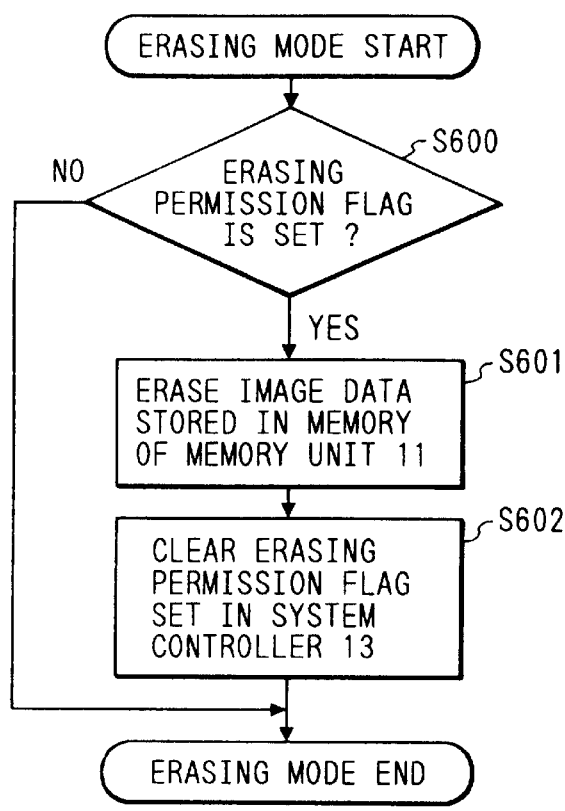

IMAGE SIGNAL PROCESSING APPARATUS HAVING AN ERASING FUNCTION

This application is a continuation of prior application, Ser. No. 07/978,502 filed Nov. 18, 1992, now abandoned.

BACKGROUND OF THE INVENTION

1. Field of the Invention

The invention relates to an image signal processing apparatus for processing an image signal and, more particularly, to an image signal processing apparatus for storing an image signal onto a memory medium and for generating the image signal stored on the memory medium.

2. Related Background Art

Hitherto, as an image signal processing apparatus for processing an image signal, for instance, there is an electronic still video system in which an image signal is recorded onto a plurality of concentrical recording tracks which are formed on a magnetic disk, an arbitrary one of the recording tracks on the magnetic disk is selected, and the image signal recorded on the selected recording track is reproduced.

In the electronic still video system, a claw to prevent an erroneous erasure is provided for a jacket in which the magnetic disk is enclosed. So long as the claw for prevention of the erroneous erasure is not broken off, the image signal can be freely recorded to each of the recording tracks on the magnetic disk enclosed in the jacket or the signal on the recording track on which the image signal has been recorded can be freely erased.

In the conventional electronic still video system, however, when the claw for prevention of the erroneous erasure which is provided for the jacket in which the magnetic disk is enclosed is not broken off, the image signal can be freely recorded onto or erased from the magnetic disk enclosed in the jacket, so that there is a possibility such that the image signal recorded on the magnetic disk is erroneously erased.

SUMMARY OF THE INVENTION

It is an object of the invention to provide an image signal processing apparatus which can solve the above problem.

Another object of the invention is to provide an image signal processing apparatus which can prevent the erroneous erasure of the image signal stored on a memory medium by a simple construction.

To accomplish the above objects, according to a preferred embodiment of the invention, there is provided an image signal processing apparatus for processing an image signal, comprising: memory means for receiving the image signal, for storing the input image signal onto a memory medium, and for generating the image signal stored on the memory medium; and control means for enabling only the image signal generated from the memory means to be erased in the image signal stored in the memory means.

Yet another object of the invention is to provide an image signal processing apparatus which can change an image signal which has already been stored on a memory medium to another image signal without erroneously erasing, by a simple construction.

To accomplish the above object, according to a preferred embodiment of the invention, there is provided an image signal processing apparatus for processing an image signal, comprising: memory means for receiving the image signal, for storing the input image signal onto a memory medium, and for generating the image signal stored on the memory medium; and control means for enabling only the image signal generated from the memory means to be changed to another image signal in the image signal stored in the memory means.

The above and other objects and features of the present invention will become apparent from the following detailed description and the appended claims with reference to the accompanying drawings.

BRIEF DESCRIPTION OF THE DRAWINGS

FIG. 2 is an operation flowchart for explaining the operation in a movie mode of the electronic still video system shown in FIG. 1;

FIG. 3 is an operation flowchart for explaining the operation in a copy mode of the electronic still video system shown in FIG. 1;

FIG. 4 is an operation flowchart for explaining the operation in an erasing mode of the electronic still video system shown in FIG. 1;

FIG. 6 is an operation flowchart for explaining the operation in the movie mode of the electronic still video system shown in FIG. 5;

FIG. 7 is an operation flowchart for explaining the operation in the copy mode of the electronic still video system shown in FIG. 5; and FIG. 8 is an operation flowchart for explaining the operation in the erasing mode of the electronic still video system shown in FIG. 5.

DESCRIPTION OF THE PREFERRED EMBODIMENTS

The invention will be described hereinbelow with respect to preferred embodiments.

Figure 1:
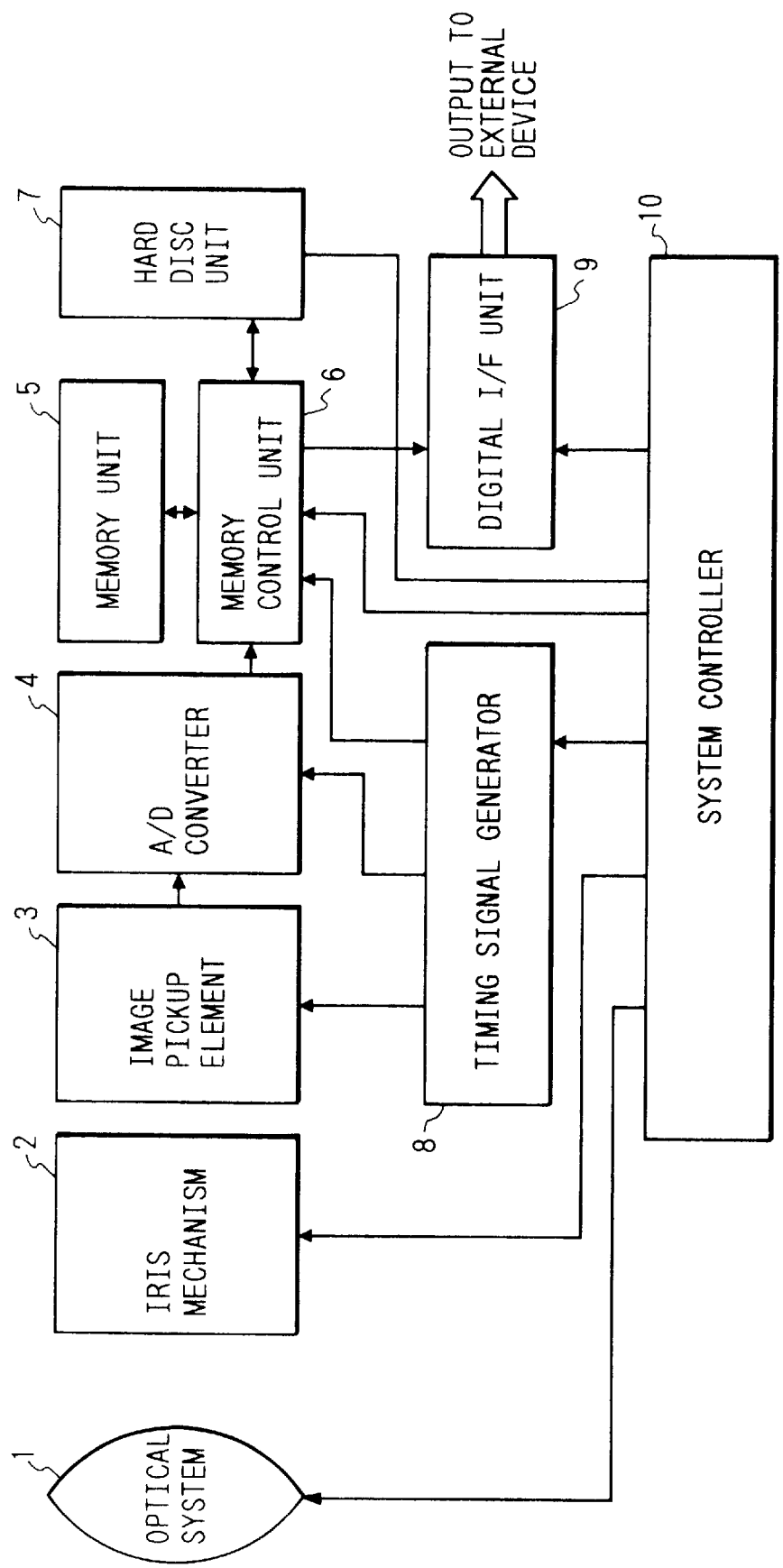
FIG. 1 is a block diagram showing a schematic construction of an electronic still video system according to an embodiment to which the invention is applied.

FIG. 1 is a block diagram showing a schematic construction of an electronic still video system according to an embodiment to which the invention is applied.

In FIG. 1, reference numeral 1 denotes an optical system comprising an image pickup lens; 2 an iris mechanism; 3 an image pickup element; 4 an analog/digital (A/D) converter to convert an analog image signal which is generated from the image pickup element 3 into digital image data; 5 a memory unit which has a memory and stores the image data generated from the A/D converter 4 into the memory or reads out the image data stored in the memory; 7 a hard disc unit which has a hard disc and stores the image data generated from the A/D converter 4 onto the hard disc or reads out the image data stored on the hard disc; 9 a digital interface (I/F) unit for transmitting the image data read out from the hard disc unit 7 to an external device (not shown) such as a computer, printer, or the like; 6 a memory control unit to control the storing operation of the image data to the memory unit 5 or hard disc unit 7 and the transmitting operation of the image data to the external device; 8 a timing signal generator to generate various kinds of timing signals to the image pickup element 3, A/D converter 4, and memory control unit 6; and 10 a system controller to control the operation of the whole system.

The operation in the electronic still video system shown in FIG. 1 in the case of storing an image pickup signal to the hard disc will now be described hereinbelow.

When the start of the storing operation of the image pickup signal is instructed to the system controller 10 by operating a trigger switch in an operation unit (not shown), the image pickup signal corresponding to an object image formed on an image pickup surface of the image pickup element 3 through the optical system 1 and iris mechanism 2 is generated from the image pickup element 3. The image pickup signal is subsequently converted into the digital image data by the A/D converter 4. After that, the digital image data is supplied to the memory unit 5 through the memory control unit 6 and is temporarily stored into the memory unit 5. The image data stored once in the memory unit 5 is read out and is again sent to the hard disc unit 7 via the memory control unit 6 and stored onto the hard disc in the hard disc unit 7.

The operation in a transfer mode (movie mode) to transmit the image data which had been picked up by the image pickup element 3 and has been stored in the hard disc unit 7 as mentioned above to the external computer, printer, or the like will now be described with reference to an operation flowchart shown in FIG. 2.

First, when the start of the operation in the movie mode is instructed to the system controller 10 by operating a switch in the operation unit (not shown), an object image is picked up by the image pickup element 3. The image data stored on the hard disc in the hard disc unit 7 is read out (S100 in FIG. 2). The read-out image data is supplied to the memory unit 5 through the memory control unit 6 and is temporarily stored (S101 in FIG. 2).

After the image data was once stored into the memory unit 5 as mentioned above, the image data stored in the memory unit 5 is read out (S102 in FIG. 2). The image data is transferred to the external computer, printer, or the like through the memory control unit 6 and the digital I/F unit 9 (S103 in FIG. 2).

In the transferring operation of the image data mentioned above, a check is made to see if the transfer of the image data has been completed between the system controller 10 and the external computer, printer, or the like through the digital I/F unit 9 or not (S104 in FIG. 2). If the transfer of the image data has been completed, the system controller 10 is set in a manner such that the transferred image data which has been stored on the hard disc in the hard disc unit 7 can be erased or new image data can be written into a sector in which the transferred image data has been stored (S105 in FIG. 2).

In the above operation, the image data read out from the hard disc unit 7 is supplied to the digital I/F unit 9 through the memory unit 5. However, the image data which is generated from the hard disc unit 7 without passing through the memory unit 5 can be also directly supplied to the digital I/F unit 9. In this case, the operations in steps S101 and S102 in FIG. 2 can be omitted.

The operation in a copy transfer mode (copy mode) to transmit arbitrary image data in the image data stored in the hard disc unit 7 to the external computer, printer, or the like will now be described with reference to an operation flowchart shown in FIG. 3.

First, when the start of the operation in the copy mode is instructed to the system controller 10 by operating a switch in the operation unit (not shown), arbitrary image data in the image data stored on the hard disc in the hard disc unit 7 is read out (S200 in FIG. 3). The read-out image data is supplied to the memory unit 5 through the memory control unit 6 and is temporarily stored (S201 in FIG. 3).

After the image data was once stored into the memory unit 5 as mentioned above, the image data stored in the memory unit 5 is read out (S202 in FIG. 3). The read-out image data is transferred to the external computer, printer, or the like through the memory control unit 6 and digital I/F unit 9 (S203 in FIG. 3).

In the transferring operation of the image data mentioned above, a check is made to see if the transfer of the image data between the system controller 10 and the external computer, printer, or the like through the digital I/F unit 9 has been completed or not (S204 in FIG. 3). After the transfer of the image data was completed, an erasing permission flag for the transferred image data stored on the hard disc in the hard disc unit 7 is set into the system controller 10 (S205 in FIG. 3).

In the above operation, the image data read out from the hard disc unit 7 is supplied to the digital I/F unit 9 through the memory unit 5. However, the image data which is generated from the hard disc unit 7 without passing through the memory unit 5 also can be directly supplied to the digital I/F unit 9. In this case, the operations in steps S201 and S202 in FIG. 3 can be omitted.

The operation in an erasing mode to erase arbitrary image data in the image data already stored in the hard disc unit 7 will now be described with reference to an operation flowchart shown in FIG. 4.

First, when the start of the operation in the erasing mode is instructed to the system controller 10 by operating a switch in the operation unit (not shown), the system controller 10 detects a sector in which the image data has been transferred to the external computer, printer, or the like and the erasing permission flag has been set as mentioned above among the sectors in which the image data has been stored on the hard disc in the hard disc unit 7, thereby discriminating whether it is the sector in which the transferred image data has been stored or not (S300 in FIG. 4). When it is the sector in which the erasing permission flag has been set, it is determined that the image data stored in such a sector is the transferred image data. The system controller 10 is set in a manner such that the transferred image data stored on the hard disc in the hard disc unit 7 can be erased or new image data can be written into the sector in which the transferred image data has been stored (S301 in FIG. 4). Further, the erasing permission flag set in the system controller 10 is cleared (S302 in FIG. 4).

Figure 5:
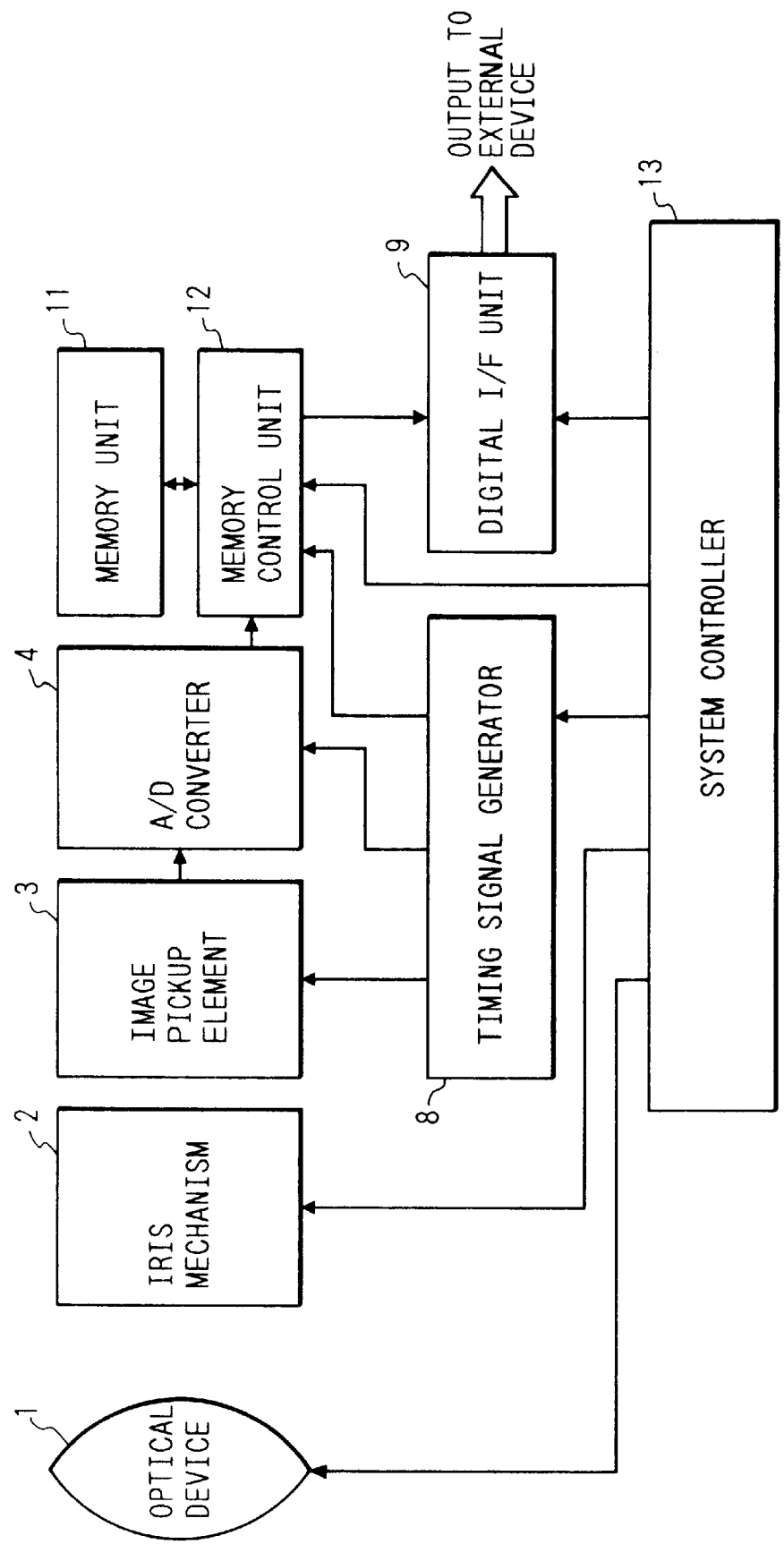
FIG. 5 is a block diagram showing a schematic construction of an electronic still video system according to another embodiment to which the invention is applied.

FIG. 5 is a block diagram showing a schematic construction of an electronic still video system according to another embodiment to which the invention is applied.

The system shown in FIG. 5 doesn't have the hard disc unit and is constructed so as to store image data by only the memory unit. In FIG. 5, component elements having functions similar to those in the system shown in FIG. 1 are designated by the same reference numerals and their detailed descriptions are omitted here.

The storing operation of an image pickup signal into the memory unit in the electronic still video system shown in FIG. 5 will now be described hereinbelow.

When the start of the storing operation of the image pickup signal is instructed to a system controller 13 by operating a trigger switch in an operation unit (not shown), the image pickup signal corresponding to an object image formed on the image pickup surface of the image pickup element 3 is generated from the image pickup element 3 through the optical system 1 and iris mechanism 2. The output image pickup signal is converted into the digital image data by the A/D converter 4. After that, the digital image data is supplied to a memory unit 11 through a memory control unit 12 and stored into a memory in the memory unit 11.

The operation in a transfer mode (movie mode) to transmit the image data which had been picked up by the image pickup element 3 and has been stored in the memory unit 11 as mentioned above to the external computer, printer, or the like will now be described with reference to an operation flowchart shown in FIG. 6.

First, when the start of the operation in the movie mode is instructed to the system controller 13 by operating a switch in the operation unit (not shown), the image data which had been picked up by the image pickup element 3 and has been stored in the memory in the memory unit 11 is read out (S400 in FIG. 6). The read-out image data is transferred to the external computer, printer, or the like through the memory control unit 12 and the digital I/F unit 9 (S401 in FIG. 6).

In the transferring operation of the image data mentioned above, a check is made to see if the transfer of the image data between the system controller 13 and the external computer, printer, or the like through the digital I/F unit 9 has been completed or not (S402 in FIG. 6). When the transfer of the image data is completed, the system controller 13 is set in a manner such that the transferred image data stored in the memory in the memory unit 11 can be erased or new image data can be written into the address in which the transferred image data has been stored (S403 in FIG. 6).

The operation in a copy transfer mode (copy mode) to transmit arbitrary image data in the image data already stored in the memory unit 5 to the external computer, printer, or the like will now be described with reference to an operation flowchart shown in FIG. 7.

First, when the start of the operation in the copy mode is instructed to the system controller 13 by operating a switch in the operation unit (not shown), arbitrary image data in the image data stored in the memory in the memory unit 11 is read out (S500 in FIG. 7). The read-out image data is transferred to the external computer, printer, or the like through the memory control unit 12 and the digital I/F unit 9 (S501 in FIG. 7).

In the transfer operation of the image data mentioned above, a check is made to see if the transfer of the image data between the system controller 13 and the external computer, printer, or the like through the digital I/F unit 9 has been completed or not (S502 in FIG. 7). When the transfer of the image data is completed, the erasing permission flag for the transferred image data stored in the memory in the memory unit 11 is set into the system controller 13 (S503 in FIG. 7).

The operation in the erasing mode to erase arbitrary image data in the image data already stored in the memory unit 11 will now be described with reference to an operation flowchart shown in FIG. 8.

First, when the start of the operation in the erasing mode is instructed to the system controller 13 by operating a switch in the operation unit (not shown), the system controller 13 detects the address in which the image data has been transferred to the external computer, printer, or the like and the erasing permission flag has been set as mentioned above among the addresses in which the image data has been stored in the memory in the memory unit 11, thereby discriminating whether the address is an address in which the transferred image data has been stored or not (S600 in FIG. 8). When it is the address in which the erasing permission flag has been set, it is determined that the image data stored in such an address is the transferred image data. The system controller 13 is set in a manner such that the transferred image data stored in the memory in the memory unit 11 can be erased or new image data can be written into the address in which the transferred image data has been stored (S601 in FIG. 8). Further, the erasing permission flag set in the system controller 13 is cleared (S602 in FIG. 8).

In the embodiment as mentioned above, only in the case where the image data stored in the memory in the memory unit or on the hard disc in the hard disc unit has been transferred to the external computer, printer, or the like, can the transferred image data be erased or be rewritten to new image data. Thus, the erroneous erasure of the image data stored in the memory or on the hard disc can be prevented by a simple construction.

Although each of the above embodiments has been described with respect to a system in which the image data is stored into the memory or hard disc, the invention is not limited to such a system. The invention also can be applied to a system in which the image data is stored into a memory medium such as a magnetic disk, magnetic tape, optical disc, or the like. In this case, an effect similar to that mentioned above also can be obtained.

According to the embodiments as mentioned above, it is possible to provide an image signal processing apparatus of a simple construction which can store the image signal without erroneously erasing the image signal stored in the memory medium.

What is claimed is:

1. An image signal processing apparatus for processing an image signal, said apparatus comprising:

storage means for storing the image signal on a storage medium, and for outputting the image signal stored on the storage medium;

transfer means for reading out any one of a plurality of image signals stored on the storage medium by said storage means, for transferring the read-out image signal to an external device, and for outputting a communication report of the transfer of the image signal to the external device;

setting means for selecting the image signal having been transferred by said transfer means, from among the plurality of image signals stored on the storage medium by said storage means, according to the communication report output by said transfer means, and for setting the selected image signal to be erasable; and erasing means for erasing only the image signal set to be erasable by said setting means, from among the plurality of image signals stored on the storage medium by said storage means.

2. An apparatus according to claim 1, wherein said storage means comprises a hard disc apparatus.

3. An apparatus according to claim 1, wherein said storage means comprises a memory card having a semiconductor memory device therein.

4. An apparatus according to claim 1, wherein said setting means further sets an erasing permission flag corresponding to the selected image signal.

5. An apparatus according to claim 4, wherein said erasing means erases only the image signal to which the erasing permission flag has been set, by said setting means, from among the plurality of image signals stored on the storage medium by said storage means.

6. An image signal processing method for processing an image signal, comprising the steps of:

storing the image signal on a storage medium and outputting the image signal stored on the storage medium;

reading out any one of a plurality of image signals stored on the storage medium in said storing step;

transferring the read-out image signal to an external device, and outputting a communication report of the transfer of the image signal to the external device;

selecting the image signal having been transferred in said transfer step, from among the plurality of image signals stored on the storage medium in said storing step, according to the communication report output in said transfer step, and setting the selected image signal to be erasable; and erasing only the image signal set to be erasable in said setting step, from among the plurality of image signals stored on the storage medium in said storing step.

7. An image signal processing apparatus for processing an image signal, said apparatus comprising:

storage means for storing the image signal on a storage medium and outputting the image signal stored on the storage medium;

transfer means for reading out any one of a plurality of image signals stored on the storage medium by said storage means, for transferring the read-out image signal to an external device, and for outputting a communication report of the transfer of the image signal to the external device;

setting means for selecting the image signal having been transferred by said transfer means, from among the plurality of image signals stored on the storage medium by said storage means, according to the communication report output by said transfer means, and for setting the selected image signal to be changeable to another image signal; and changing means for changing only the image signal, set to be changeable by said setting means from among the plurality of image signals stored on the storage medium by said storage means, to the other image signal.

8. An apparatus according to claim 7, wherein said storage means comprises a hard disc apparatus.

9. An apparatus according to claim 7, wherein said storage means comprises a memory card that includes a semiconductor memory device.

10. An apparatus according to claim 7, wherein said setting means further sets a change permission flag corresponding to the selected image signal.

11. An apparatus according to claim 10, wherein said changing means changes only the image signal, to which the change permission flag has been set by said setting means, from among the plurality of image signals stored on the storage medium by said storage means, to the other image signal.

12. An image processing method for processing an image signal, comprising steps of:

storing the image signal on a storage medium and outputting the image signal stored on the storage medium;

reading out any one of a plurality of image signals stored on the storage medium in said storing step;

transferring the read-out image signal to an external device, and outputting a communication report of the transfer of the image signal to the external device;

selecting the image signal having been transferred in said transfer step, from among the plurality of image signals stored on the storage medium in said storing step, according to the communication report output in said transfer step, and setting the selected image signal to be changeable to another image signal; and changing only the image signal, set to be changeable in said setting step from among the plurality of image signals stored on the storage medium in said storing step, to the other image signal.

\* \* \* \* \*